United States Patent
Buyukkokten

(10) Patent No.: US 10,198,739 B2
(45) Date of Patent: Feb. 5, 2019

(54) ASSIGNING ACHIEVEMENT DESIGNATIONS IN A NETWORK

(71) Applicant: Google Inc., Mountain View, CA (US)

(72) Inventor: Orkut Buyukkokten, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 13/727,509

(22) Filed: Dec. 26, 2012

(65) Prior Publication Data

US 2014/0180781 A1    Jun. 26, 2014

(51) Int. Cl.
*G06Q 30/02* (2012.01)
*G06Q 50/00* (2012.01)

(52) U.S. Cl.
CPC ......... *G06Q 30/0209* (2013.01); *G06Q 30/02* (2013.01); *G06Q 50/01* (2013.01)

(58) Field of Classification Search
CPC ............... G06Q 50/01; G06Q 30/0218; G06Q 30/0226; G06Q 30/0214; G06Q 30/0239; G06Q 30/0207
USPC ........................................................ 705/14.2
See application file for complete search history.

(56) References Cited

U.S. PATENT DOCUMENTS

| 8,706,647 | B2 * | 4/2014 | Pathak et al. ............... 705/319 |
| 9,098,859 | B2 * | 8/2015 | Moinuddin ............ G06Q 30/02 |
| 2009/0326970 | A1 * | 12/2009 | Estrada ................. G06Q 30/02 705/1.1 |
| 2010/0228614 | A1 | 9/2010 | Zhang et al. |
| 2011/0161148 | A1 | 6/2011 | Schmidt |
| 2011/0184792 | A1 * | 7/2011 | Butcher et al. ............. 705/14.13 |
| 2011/0218847 | A1 | 9/2011 | Razzaque et al. |
| 2011/0288912 | A1 * | 11/2011 | McCrea ................. G06Q 30/02 705/14.2 |
| 2012/0253918 | A1 * | 10/2012 | Marois et al. ............. 705/14.39 |

(Continued)

OTHER PUBLICATIONS

Engagement and Cooperation in Social Networks: Do Benefits and Rewards Help? Sanat Kumar Bista, Surya Nepal, Cecile Paris CSIRO ICT Centre Canberra, Australia.*

(Continued)

*Primary Examiner* — Kambiz Abdi
*Assistant Examiner* — Victoria E Frunzi
(74) *Attorney, Agent, or Firm* — Patent Law Works LLP

(57) ABSTRACT

Systems and methods configured to award achievement designations to users connected by a network are described, wherein users are automatically granted these achievement designations based on their user profiles and activity. An achievement creation module formulates a plurality of achievement designations based on predefined criteria and a user profile creation/retrieval module obtains one or more user profiles for users of the network. A user activity determination module is configured to determine user activities relating to the one or more user profiles and an achievement designation module awards an appropriate one of the plurality of achievement designations to a particular user based on the particular user's activities. A notification module is configured to notify the one or more user profiles of the achievement designations and a user interface module of the system is configured to provide the achievement designations to a user interface associated with the users for display.

24 Claims, 15 Drawing Sheets

(56) References Cited

U.S. PATENT DOCUMENTS

| | | | | |
|---|---|---|---|---|
| 2012/0323647 | A1* | 12/2012 | Klooster | G06Q 30/02 |
| | | | | 705/14.1 |
| 2013/0006709 | A1* | 1/2013 | Kosta | G07F 17/3206 |
| | | | | 705/7.29 |
| 2013/0151513 | A1* | 6/2013 | Aguera y Arcas | |
| | | | | G06F 17/3087 |
| | | | | 707/728 |
| 2013/0238392 | A1* | 9/2013 | Sloan et al. | 705/7.29 |
| 2013/0254286 | A1* | 9/2013 | Jean-Claude | 709/204 |
| 2013/0268377 | A1* | 10/2013 | Jessup et al. | 705/14.73 |

OTHER PUBLICATIONS

International Search Report and Written Opinion for PCT/US2013/077618, dated Apr. 23, 2014, 10 pages.
Extended European Search Report for European Application No. 13867759.6, dated Jul. 20, 2016, 7 pages.

* cited by examiner

600

| Examples of Achievement Designation Categories | Examples of Achievement Designations |
|---|---|
| Profile Status | Busy Body |
| Friend | Connector |
| Charm | Self Assured |
| Wall | Focal Point |
| Group | Conversationalist |
| Message | Welcome Wagon |
| Events | Party Starter |
| Media | Post Office |
| Location | Explorer |
| Collection | Donor |
| Knowledge | Advisor |
| Shelf | Recorder |
| Classifieds | Broker |
| Drinks | Barkeep |
| Q & A | Querier |
| Poll | Brainy |
| Music | Local Club |
| Genealogy | In Touch |
| Sports | Sports Buff |
| Travel | Day Tripper |
| Pledge | Rallyer |
| Photos | Image Maker |
| Tracker | Curio |
| Finance | Wall Street Wizard |
| Dating | Head Turner |
| Persona | Animal Obsessed |

ASSIGNING ACHIEVEMENT DESIGNATIONS IN A NETWORK

BACKGROUND

The present disclosure relates to awarding users with achievement designations within a network when they earn achievements based on their profiles and social actions or activity, for example, by determining a context corresponding to user profiles, social actions, or activity.

In recent years, video games have become increasingly popular, and have introduced video game trophies, for example, awards, achievements, etc., that gamers can typically attain upon accomplishing certain pre-defined goals relating to the games. These types of awards or achievements are awarded when gamers accomplish their goals. As one example, a particular user's goal may be to play a particular game a predetermined number of times. As another example, a particular user's game may be to achieve a certain level of skill in a given amount of time. In some instances, users may attain arbitrary challenges that are independent to the goals. In all instances, video game trophies give gamers a sense of accomplishment and may bestow benefits on them, for example, additional game-play features or game content or perhaps may display user accomplishments on a public profile. Awarding achievements can provide a large number of benefits to the game experience including, motivating game activity, reinforcing desired behavior, facilitating activity, and building a reputation.

In a similar vein, networks (e.g., social) have become popular in recent years. Many people interact via networks on a daily basis to maintain social relationships. Yet there is no system for awarding users in any way.

SUMMARY

According to one innovative aspect of the subject matter described in this disclosure, the systems disclosed include a processor and memory including instructions that, when executed, cause the system to determine a context corresponding to a user profile and activity within a network of users who are connected to other users in the network by establishing connections; apply predefined criteria based on the context to evaluate the user profile and activity of particular users to determine when they satisfy requirements for a plurality of different categories created to classify users based on user profile and activity; assign achievement designations to particular users based on their user profile and activity within the network, wherein the plurality of achievement designations are automatically granted when users satisfy the predefined criteria for the different categories; notify users of the achievement designations assigned to them; and provide the achievement designations assigned to users on a user interface for display.

In general, another innovative aspect of the subject matter described in this disclosure may be embodied in methods using at least one computing device that include: determining a context corresponding to a user profile and activity within a network of users who are connected to other users in the network by establishing connections; applying predefined criteria based on the context to evaluate the user profile and activity of particular users to determine when they satisfy requirements for a plurality of different categories created to classify users based on user profile and activity; assigning achievement designations to particular users based on their user profile and activity within the network, wherein the plurality of achievement designations are automatically granted when users satisfy the predefined criteria for the different categories; notifying users of the achievement designations assigned to them; and providing the achievement designations assigned to users on a user interface for display.

Other implementations of one or more of these aspects include corresponding systems, apparatus, and computer programs, configured to perform the action of the methods, encoded on computer storage devices.

These and other implementations may each optionally include one or more of the following features or operations. For instance, the features include that the achievement designation may relate to a promotion, that the achievement designation may relate to a gender of the particular user, that the achievement designation is configured to unlock at least one additional achievement designation, that the achievement designation is configured to unlock particular content within a network, that the achievement designation is awarded through a purchase, that the achievement designation is awarded through a nomination process, that the achievement designation is awarded through a third party application, that the achievement designation is configured to award benefits to the user including participation in a particular activity, and that the achievement designation awards benefits to the user including display of the achievement designation via a public profile. For instance, the operations further include that the achievement designation relates to a promotion; that the achievement designation relates to a gender of the user; that the achievement designation unlocks at least one additional achievement designation; that the achievement designation is unlocks particular content within the network; that the achievement designation is awarded via a purchase; that the achievement designation is awarded via a nomination process; that the achievement designation is awarded via a third party application; that the achievement designation awards benefits to the user, wherein at least one of the benefits includes participation in a particular activity; that the achievement designation awards benefits to the user, wherein at least one of the benefits includes display of the achievement designation via a public profile.

The systems and methods disclosed below are advantageous in a number of respects. With the ongoing trends and growth in social network communication, it may be beneficial to create network achievements for users that are automatically generated and granted based on their profiles and social activity. The systems and methods by automatically granting achievements provide ways to further facilitate and motivate activity by users within a network that is fun, engaging, and earns social appreciation by others. Moreover, by utilizing this technology, the systems and methods reinforce desired behavior within the network and build reputations for the users based on their profiles and activities, thereby adding to the experience of the network.

BRIEF DESCRIPTION OF THE DRAWINGS

The present disclosure is illustrated by way of example, and not by way of limitation, in the figures of the accompanying drawings, in which like reference numerals are used to refer to similar elements.

FIG. 6 is a graphic representation of a list of example achievement categories and achievement designations.

DETAILED DESCRIPTION

Figure 1:
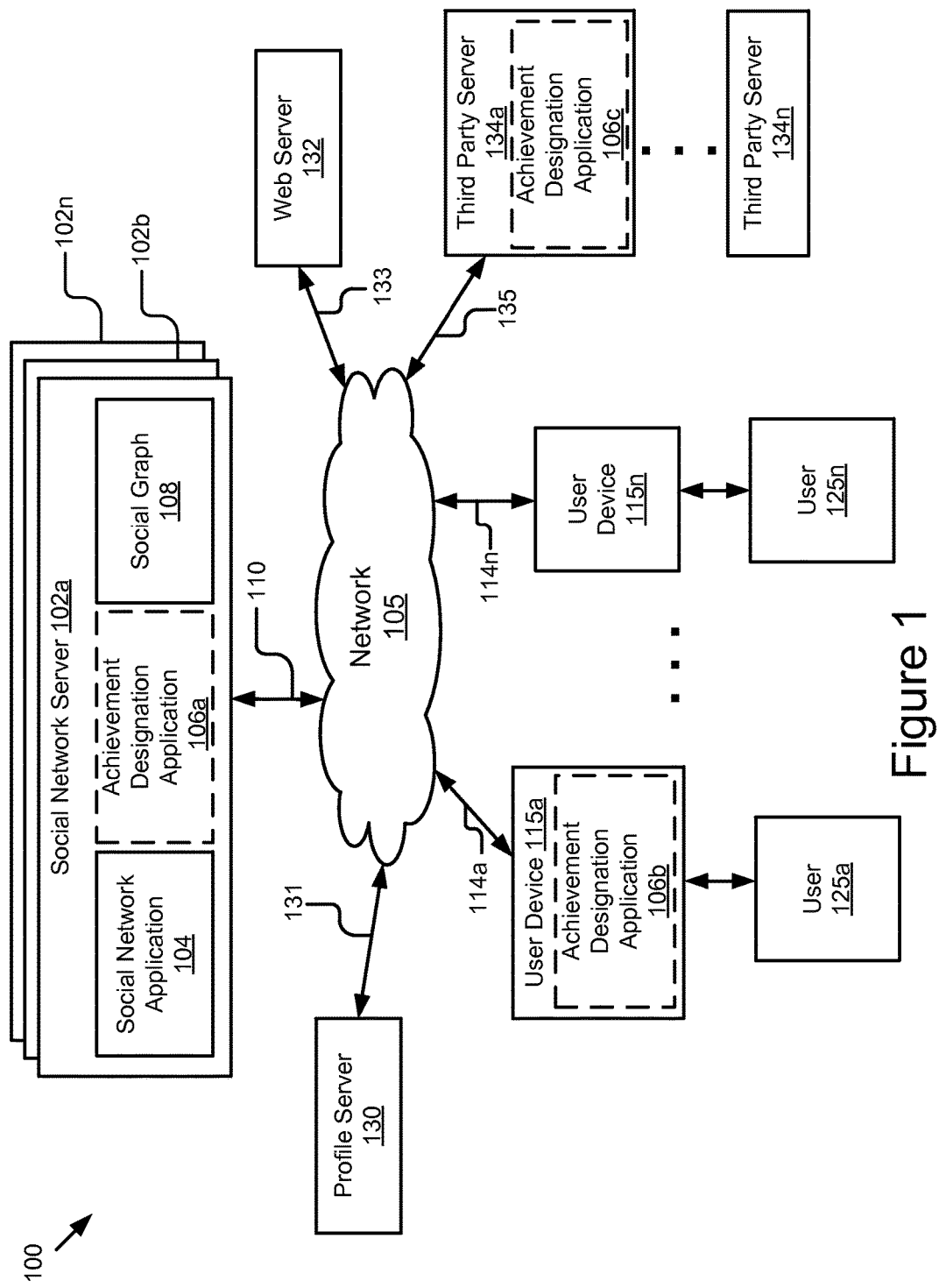
FIG. 1 is a block diagram illustrating an example system for awarding achievements within a network including an achievement designation application, which determines a context corresponding to user profiles, social actions, or activity.

In some implementations, this technology includes systems and methods for awarding "achievement" designations to one or more users within a network based on a particular user's activities within the network or information for the user (or user profile), for example, by determining a context corresponding to user profiles (e.g., content specific to a user) or social actions or activity (e.g., user interactions). In some implementations, the context may include one or more from a group of an application or social graph relating to a user, a user interface, a contact group, a profile, communications, and content specific to a user. An "achievement" in a network may either be a social distinction that is accorded to users, or certain social or cultural characteristics that a plurality of users may share, or an indication or designation that users have achieved a certain level in a progression of tasks or a set of requirements. The achievement designations may indicate awards given to users of a network (e.g., social network) for a plethora of reasons, for example, for completing predefined tasks or otherwise. As one example, an award may be given to a user having a particular number of friends. As another example, an award may be given to a user for posting a certain number of comments. These achievements may be automatically granted by the system and may have criteria that unlock them and make them available for a user.

In some implementations, the system permits users in a network to earn achievements as a result of their profiles or activities in the network. It should be understood that user profiles or activities are considered based on determining a context corresponding to user content or interactions in a network. The achievements may be earned by users based on a set of rules, conditions, or criteria that the user is required to fulfill. Achievements may be classified into categories and those that fall in the same category share rules or criteria with similar parameters. Achievements may include different ranks and may be configured to permit users to earn the achievements in the same category progressively.

In some instances, achievements may be just titles or may give direct benefits to the user earning them, for example unlocking particular features or content. Criteria may include a plethora of properties of a user or sets of user actions that may be configured to automatically trigger an "unlocking" operation of an achievement. In some instances, the properties of a user may be either explicitly stated by the user profile or implicitly computed by the system. The values that are used to determine achievement status may be measured by a sum, a time interval, or an occurrence frequency (for example, of a user action or a user profile characteristic).

In the following description, for purposes of explanation, numerous specific details are indicated in order to provide a thorough understanding of the technology described. It should be apparent, however, that this technology can be practiced without these specific details. In other instances, structures and devices are shown in block diagram form in order to avoid obscuring the technology. For example, the present technology is described with some implementations below with reference to user interfaces and particular hardware. However, the present technology applies to any type of computing device that can receive data and commands, and any devices providing services. Moreover, the present technology is described below primarily in the context of providing support for awarding achievement designations to one or more users within a network; however, it should be understood that the present technology applies to any type of achievements and can be used for other applications beyond networks. In particular, this technology for awarding achievement designations may be used in other contexts besides networks.

Reference in the specification to "one implementation," "an implementation," or "some implementations" means simply that one or more particular features, structures, or characteristics described in connection with the one or more implementations is included in at least one or more implementations that are described. The appearances of the phrase "in one implementation" in various places in the specification are not necessarily all referring to the same implementation.

Some portions of the detailed descriptions that follow are presented in terms of algorithms and symbolic representations of operations on data bits within a computer memory of either one or more computing devices. These algorithmic descriptions and representations are the means used by those in the data processing arts to most effectively convey the substance of their work to others in the field. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms for example "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may comprise a general-purpose computer selectively activated or reconfigured by a computer program stored in the computer. Such a computer program may be stored in a computer-readable storage medium, for example, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology can take the form of an entirely hardware implementation, an entirely software implementation, or an implementation including both hardware and software components. In some implementations, this technology is implemented in software, which includes but is not limited to firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

FIG. 1 is a high-level block diagram illustrating some implementations of systems for awarding achievement designations to one or more users of an example social network. The system 100 illustrated in FIG. 1 provides overall system architecture for awarding achievement designations to one or more users of the example social network. The system 100 includes one or more social network servers 102a, 102b, through 102n, that may be accessed via user devices 115a through 115n, which are used by users 125a through 125n, to connect to any one of the social network servers 102a, 102b, through 102n. These entities are communicatively coupled via a network 105. Although only two user devices 115a through 115n are illustrated, any numbers of user devices 115n may be used by any number of users 125n. It should be recognized that while the present disclosure is described below primarily in the context of awarding achievement designations to one or more users of a network, the present disclosure may be applicable to other situations where awarding achievement designations for any purpose that is not related to networks is necessary or desired. For ease of understanding and brevity, the description the present disclosure is described in reference to awarding achievement designations to one or more users of a network based on the user activities or user information within a network, which is based on determining a context corresponding to the users activities or information. The context may include one or more of a user interface, a connection, an application, a social graph, a contact group, a profile, communications, and content specific to a user.

The user devices 115a through 115n in FIG. 1 are illustrated by way of example. Again, although FIG. 1 illustrates only two devices, the present disclosure applies to any system architecture having one or more user devices 115, therefore, any number of user devices 115n may be used. Furthermore, while only one network 105 is illustrated as coupled to the user devices 115a through 115n, the social network servers, 102a-102n, the profile server 130, the web server 132, and third party servers 134a through 134n, in practice, any number of networks 105 may be connected to these entities. In addition, although only two third party servers 134a through 134n are shown, the system 100 may include any number of third party servers 134n.

In some implementations, the social network server 102a may be coupled to the network 105, via a signal line 110. The social network server 102a includes a social network application 104, which includes the software routines and instructions to operate the social network server 102a and its functions and operations. Although only one social network server 102a is described here, multiple servers may be present, as illustrated by social network servers 102b through 102n, each with functionality similar to social network server 102a or different.

The term "social network" as used here includes, but is not limited to, any type of social structure where the users are connected by a common feature or link. The common feature includes relationships/connections, for example, friendship, family, work, a similar interest, etc. The common features are provided by one or more social networking systems, for example those included in the system 100, including explicitly-defined relationships and relationships implied by social connections with other online users, where the relationships form the social graph 108.

The term "social graph" as used here includes, but is not limited to, a set of online relationships between users, for example, provided by one or more social networking systems, for example, the social network system 100, including explicitly-defined relationships and relationships implied by social connections with other online users, where the relationships form a social graph 108. In some examples, the social graph 108 may reflect a mapping of these users and how they are related.

It should be understood that the social network server 102a and the social network application 104 are representative of a single social network. Each of the plurality of social network servers 102a, 102b through 102n, may be coupled to the network 105, each having its own server, application, and social graph. For example, a first social network hosted on a social network server 102a may be directed to business networking, a second on a social network server 102b directed to or centered on academics, a third on a social network server 102c (not explicitly indicated) directed to local business, a fourth on a social network server 102d (not explicitly indicated) directed to dating, and yet others on social network server (102n) directed to other general interests or perhaps a specific focus.

A profile server 130 is illustrated as a stand-alone server in FIG. 1. In other implementations of the system 100, all or part of the profile server 130 may be part of the social network server 102a. The profile server 130 may be connected to the network 105, via a line 131. The profile server 130 has profiles for all the users that belong to a particular social network 102a-102n. One or more third party servers 134a through 134n are connected to the network 105, via signal line 135. A web server 132 may be connected, via line 133, to the network 105.

The social network server 102a includes an achievement designation application 106a, to which user devices 115a through 115n are coupled via the network 105. In particular, user device 115a may be coupled, via line 114a, to the network 105. The user 125a interacts via the user device 115a to access the achievement designation application 106 to receive a achievement designation. The achievement designation application 106 or certain components of it may be stored in a distributed architecture in any of the social network server 102, the third party server 134, and the user device 115. In some instances, the achievement designation application 106 may be included, either partially or entirely, in any one or more of the social network server 102, the third party server 134, and the user device 115.

The user devices 115a through 115n may be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network.

The network 105 may be of conventional type, wired or wireless, and may have any number of configurations for example a star configuration, token ring configuration, or other configurations known in the field. Furthermore, the network 105 may comprise a local area network (LAN), a wide area network (WAN, e.g., the Internet), and/or any other interconnected data path across, which one or more devices may communicate.

In some implementations, the network 105 may be a peer-to-peer network. The network 105 may also be coupled to or include portions of one or more telecommunications networks for sending data in a variety of different communication protocols.

In some implementations, the network 105 includes Bluetooth communication networks or a cellular communications network for sending and receiving data for example via short messaging service (SMS), multimedia messaging service (MMS), hypertext transfer protocol (HTTP), direct data connection, WAP, email, etc.

In some implementations, the social network servers, 102a-102n, the profile server 130, the web server 132, and the third party servers 134a through 134n are hardware servers including a processor, memory, and network communication capabilities. One or more of the users 125a through 125n may access any of the social network servers 102a through 102n, via browsers in their user devices and via the web server 132.

Figure 2:
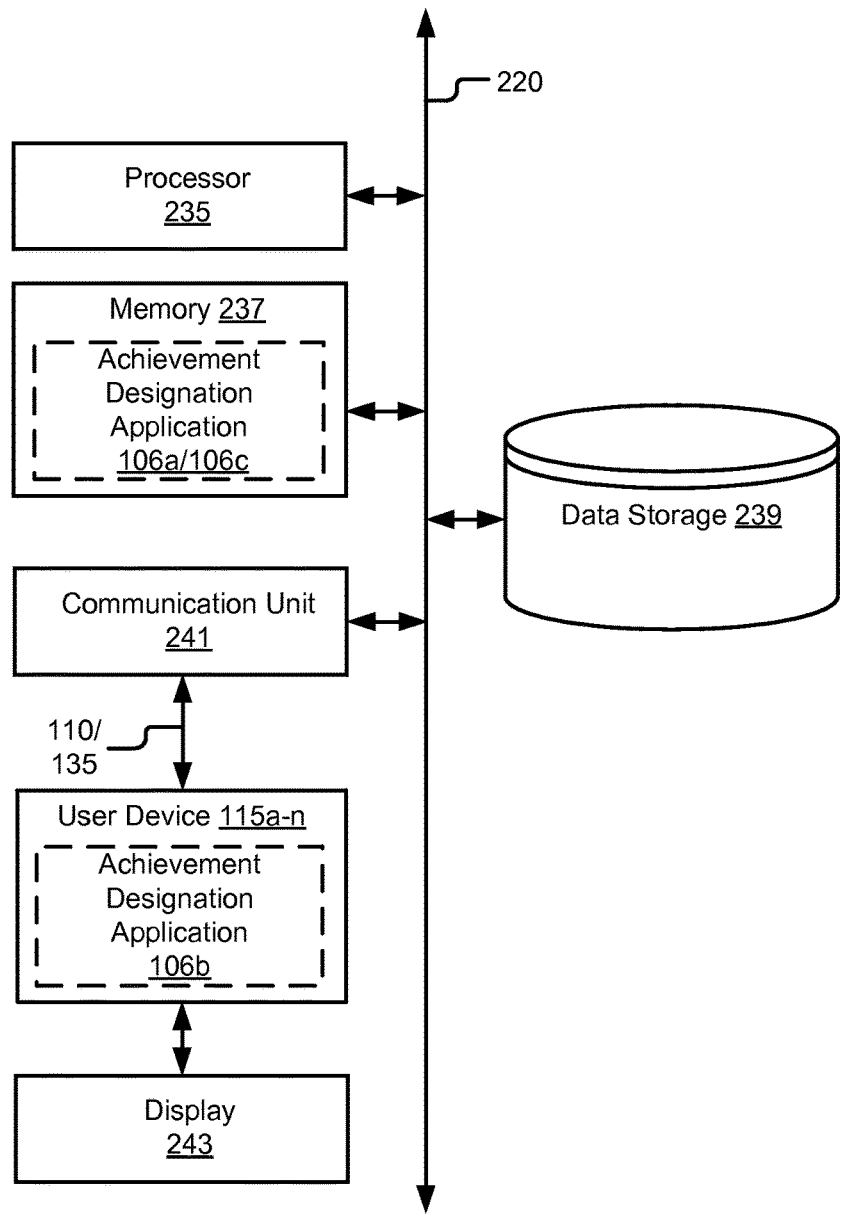
FIG. 2 is a block diagram illustrating example hardware components in some implementations of the system shown in FIG. 1.

FIG. 2 is a block diagram illustrating some implementations of a social network server 102a through 102n and third party server 134a through 134n, system 200 including an achievement designation application 106a. In FIG. 2, like reference numerals have been used to reference like components with the same or similar functionality that has been described above with reference to FIG. 1. As those components have been described above that description is not repeated here. The system 200 generally may include one or more processors, although only one processor 235 is illustrated in FIG. 2. The processor may be coupled, via a bus 220, to memory 237 and data storage 239, which stores any information relating to achievement designations, received from any of the other sources identified above. In some implementations, the data storage 239 may be a database organized by the social network. In some implementations, the achievement designation application 106 may be stored in the memory 237 or both in the memory 237 and the data storage 239.

A user 125a, via a user device 115a, interacts with a network and/or receives one or more achievement designations, via communication unit 241. The user views information from the user device 115a, via the display 243. The achievement designation application 106a (and 106c) may reside, in their entirety or parts of them, in the user's device (115a through 115n), in the social network server 102a (through 102n), or alternatively, in a separate server, for example, the third party server 134 (FIG. 1). The user device 115a communicates with the social network server 102a using the communication unit 241, via signal line 110.

Figure 3:
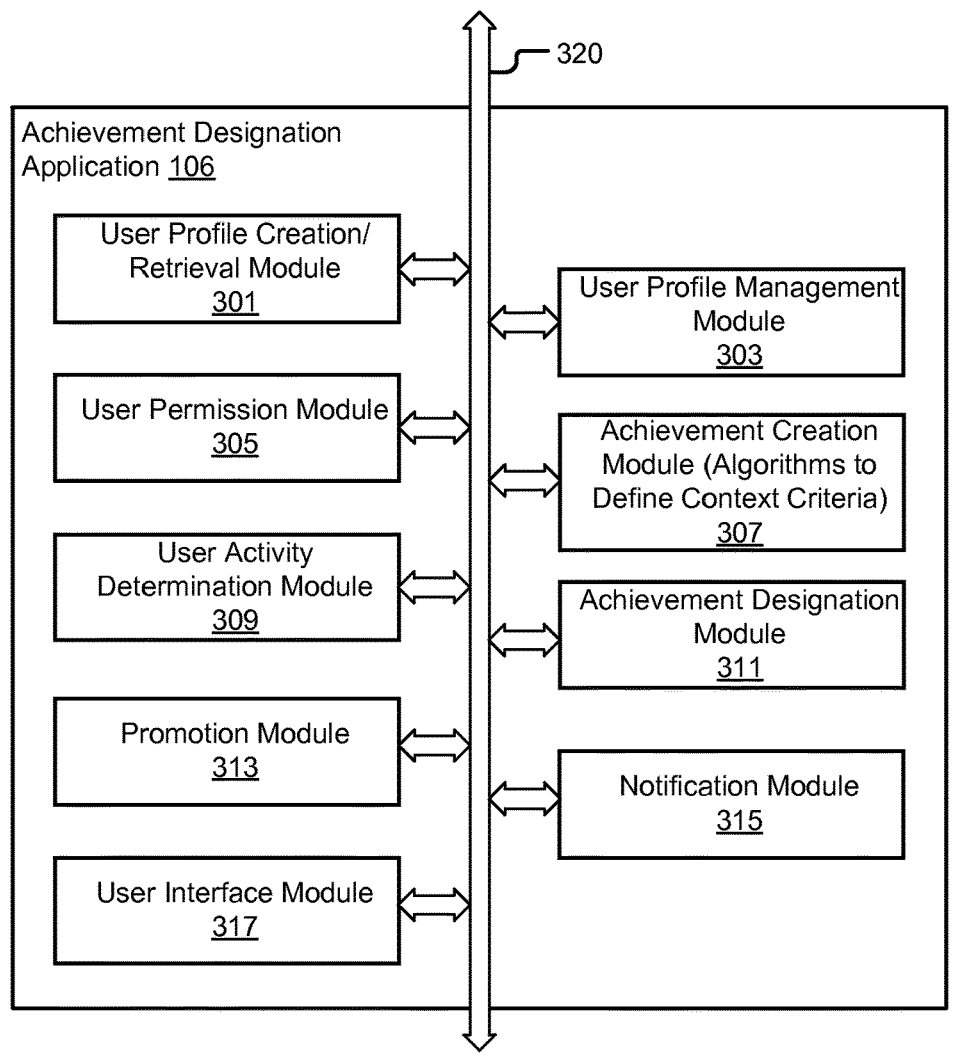
FIG. 3 is a block diagram illustrating an example achievement designation application and its software components.

Referring now to FIG. 3, like reference numerals have been used to reference like components with the same or similar functionality that has been described above with reference to FIGS. 1 and 2. As those components have been described above that description is not repeated here. The achievement designation application 106, indicated here by reference numeral 300, include various applications or engines that are programmed to perform the functionalities described here. A user profile creation/retrieval module 301 may be configured to create and/or retrieve user profiles within a network. A user profile management module 303 may be configured to manage user profile information within a network. A user permission module 305 may be configured to determine user permissions for viewing and/or editing data within a network. An achievement creation module 307 may be configured to generate achievement designations for one or more users within a network based on applying algorithms to define context-based criteria. A user activity determination module 309 may be configured to determine user activities and/or information relating to user profiles within a network. An achievement designation module 311 may be configured to award achievement designations to one or more users based on user activity (for example, by determining a context corresponding to a user interaction, a user interface, a connection, one or more communications, etc.). A promotion module 313 may be configured to promote an achievement designation based on user activity. A notification module 315 may be configured to notify a user of one or more achievement designations. A user interface module 317 may be configured to generate a user interface for displaying one or more achievement designations.

The achievement designation application 106 may include applications or engines that communicate over the software communication mechanism 320. Software communication mechanism 320 may be an object bus (for example CORBA), direct socket communication (for example TCP/IP sockets) among software modules, remote procedure calls, UDP broadcasts and receipts, HTTP connections, function or procedure calls, etc. Further, any or all of the communication could be secure (SSH, HTTPS, etc.). The software communication can be implemented on any underlying hardware, for example a network, the Internet, a bus 220 (FIG. 2), a combination thereof, etc.

The user profile creation/retrieval module 301 may be software including routines for creating and/or retrieving user profiles. In some implementations, the user profile creation/retrieval module 301 can be a set of instructions executable by the processor 235 to provide the functionality described below for creating and/or retrieving user profiles within a network. In some implementations, the user profile creation/retrieval module 301 can be stored in the memory 237 of the social network server 102 and/or the third party server 134 and can be accessible and executable by the processor 235. In either implementation, user profile creation/retrieval module 301 can be adapted for cooperation and communication with the processor 235, the communication unit 241, data storage 239 and other components of the social network server 102 and/or the third party server 134, via the bus 220.

In some implementations, the user profile creation/retrieval module 301 creates a user profile within a network. The user profile creation/retrieval module 301 receives information from one or more users and generates a user profile within the network. For example, the information may include one or more of names, occupation, employer, education history, gender, age, email, phone number, home address, URL, etc. In some implementations the user profile creation/retrieval module 301 may retrieve an existing user profile from the network database (e.g., from the social graph 108).

The user profile management module 303 may be software including routines for managing user profile information. In some implementations, the user profile management module 303 may be a set of instructions executable by the processor 235 to provide the functionality described below for managing user profile information within a network. In some implementations, the user profile management module 303 can be stored in the memory 237 of the social network server 102 and/or the third party server 134 and can be accessible and executable by the processor 235. In either implementation, user profile management module 303 can be adapted for cooperation and communication with the processor 235, the communication unit 241, data storage 239 and other components of the social network server 102 and/or the third party server 134 via the bus 220.

In some implementations, the user profile management module 303 manages user profiles within a network. For example, the user profile management module 303 adds and/or removes information relating to the network profile. The user profile management module 303 may also delete one or more user profiles within the network.

The user permission module 305 may be software including routines for determining user permissions. In some implementations, the user permission module 305 can be a set of instructions, executable by the processor 235, to provide the functionality described below for determining user permissions for viewing and/or editing data within a network. In some implementations, the user permission module 305 can be stored in the memory 237 of the social network server 102 and/or the third party server 134 and can be accessible and executable by the processor 235. In either implementation, user permission module 305 can be adapted for cooperation and communication with the processor 235, the communication unit 241, data storage 239 and other components of the social network server 102 and/or the third party server 134 via the bus 220.

In some implementations, the user permission module 305 oversees that the user device is compliant with protocols and privacy concerns of users within the network. For example, the user permission module 305 determines if a user has permission to view another user's profile.

The achievement creation module 307 may be software including routines for generating achievement designations. In some implementations, the achievement creation module 307 can be a set of instructions, executable by the processor 235, to provide the functionality described below for generating achievement designations for one or more users within a network. In some implementations, the achievement creation module 307 can be stored in the memory 237 of the social network server 102 and/or the third party server 134 and can be accessible and executable by the processor 235. In either implementation, the achievement creation module 307 may be adapted for cooperation and communication with the processor 235, the communication unit 241, data storage 239 and other components of the social network server 102 and/or the third party server 134 via the bus 220.

In some implementations, the achievement creation module 307 generates achievement designations based on predefined criteria. As examples, the predefined criteria may include updating a user status 30 times, writing 100 messages, having 25 friends, living in Las Vegas, uploading 100 photos, etc. In some implementations, the achievement designations include an image (i.e., icon or visual display) relating or not to the particular achievement designation. For example, an achievement designation for uploading 100 photos may include an image of a camera.

The user activity determination module 309 may be software including routines for determining user activities or a context corresponding to a user interaction, a user interface, or user involvement in an application, user communications etc. In some implementations, the user activity determination module 309 can be a set of instructions, executable by the processor 235, to provide the functionality described below for determining user activities and/or information relating to user profiles within a network. In some implementations, the user activity determination module 309 can be stored in the memory 237 of the social network server 102 and/or the third party server 134 and can be accessible and executable by the processor 235. In either implementation, user activity determination module 309 can be adapted for cooperation and communication with the processor 235, the communication unit 241, data storage 239, and other components of the social network server 102 and/or the third party server 134 via the bus 220.

In some implementations, the user activity determination module 309 determines a user activity based on the user's profile within an online community. Examples of user activity may include posting messages, updating a user status, inviting a user to the network, creating and/or participating in events, etc. In other implementations, the user activity determination module 309 determines user properties (i.e., information) based on a user's profile within an online community or network. As one example, user properties include having a number of friends, a number of messages, living in a particular location, a social popularity determination, number of photos, having celebrity friends, etc. In some implementations, the user activity determination module 309 may determine one or more other users' activity/information within the network.

The achievement designation module 311 may be software including routines for awarding achievement designations. In some implementations, the achievement designation module 311 can be a set of instructions, executable by the processor 235, to provide the functionality described below for awarding achievement designations to one or more users based on user activity. In other implementations, the achievement designation module 311 can be stored in the memory 237 of the social network server 102 and/or the third party server 134 and can be accessible and executable by the processor 235. In either implementation, achievement designation module 311 can be adapted for cooperation and communication with the processor 235, the communication unit 241, data storage 239 and other components of the social network server 102 and/or the third party server 134, via the bus 220.

In some implementations, the achievement designation module 311 awards one or more achievement designations based on the information determined from the user activity determination module 309. For example, the achievement designation module 311 awards an achievement designation "Connector" to a user for having 10 friends in their social network. In some implementations, the achievement designations are sent to the user interface module 317 for display on a user interface of a user device (any one of 115a through 115n). In some instances, the awarded achievement designations may be configured to unlock one or more additional achievement designations. In some instances, the awarded achievement designations may be configured to unlock content within the network. In some instances, the user interface module 317 may award achievement designations based on a purchase. In some instances, the user interface module 317 may award achievement designations based on a nomination process. In some instances, the user interface module 317 may award achievement designations based on a third party application. In some instances, the awarded achievement designations may award users particular benefits including participation in an exclusive activity.

The promotion module 313 may be software including routines for promoting an achievement designation, by determining a context corresponding to a user interaction, interface, application, information etc. In some implementations, the promotion module 313 can be a set of instructions, executable by the processor 235, to provide the functionality described below for promoting an achievement designation based on user activity. In some implementations, the promotion module 313 can be stored in the memory 237 of the social network server 102 and/or the third party server 134 and can be accessible and executable by the processor 235. In either implementation, promotion module 313 can be adapted for cooperation and communication with the processor 235, the communication unit 241, data storage 239 and other components of the social network server 102 and/or the third party server 134 via the bus 220.

In some implementations, the promotion module 313 promotes one or more achievement designations from the achievement designation module 311, based on information from the user activity determination module 309. For example, the achievement designation "Connector" may be promoted to a "Networker" achievement designation, if the user has reached a level requiring 25 friends within the social network.

The notification module 315 may be software including routines for notifying a user. In some implementations, the notification module 315 can be a set of instructions, executable by the processor 235, to provide the functionality described below for notifying a user of one or more achievement designations. In other implementations, the notification module 315 can be stored in the memory 237 of the social network server 102 and/or the third party server 134 and can be accessible and executable by the processor 235. In either implementation, the notification module 315 can be adapted for cooperation and communication with the processor 235, the communication unit 241, data storage 239, and other components of the social network server 102 and/or the third party server 134, via the bus 220.

In some implementations, the notification module 315 generates notifications for notifying a user of one or more achievement designations that have been awarded to the user within the network. For example, the notification module 315 generates a notification and sends the notification to the user interface module 317 to notify the user of an awarded achievement designation. In other implementations, the notification module 315 generates notifications relating to the requirements for one or more achievement designations. In some implementations, the notification module 315 generates notifications including a link for users to interact with the notification (e.g., delete an achievement designation or share an achievement designation, etc.).

The user interface module 317 may be software including routines for generating a user interface. In some implementations, the user interface module 317 can be a set of instructions, executable by the processor 235, to provide the functionality described below for generating a user interface for displaying one or more achievement designations. In some implementations, the user interface module 317 can be stored in the memory 237 of the social network server 102 and/or the third party server 134 and can be accessible and executable by the processor 235. In either implementation, user interface module 317 can be adapted for cooperation and communication with the processor 235, the communication unit 241, data storage 239 and other components of the social network server 102 and/or the third party server 134, via the bus 220.

In some implementations, the user interface module 317 generates a user interface for display on a user device for displaying the one or more achievement designations, notifications, and any other information that is relevant to the network. In some implementations, the user interface module 317 receives information from one or more of the modules described in the achievement designation application 106 and displays the received information to one or more users of the network via a user interface on a user device.

Figure 4A:
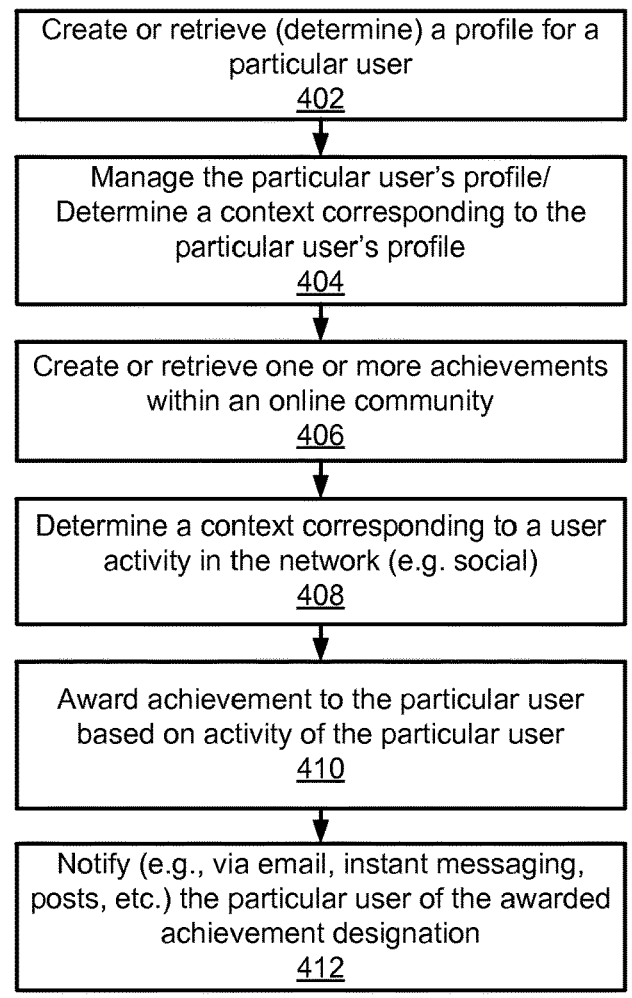
FIG. 4A is a flowchart of an example method for awarding an achievement designation to a particular user based on the particular user's activities/information, by determining a context corresponding to a user's content or interactions.

FIG. 4A is a flow chart illustrating an example method 400 for awarding an achievement designation to a particular user based on the particular user's activities and/or information, by determining a context corresponding to the particular user's interactions in the network and/or content specific to the particular user. It should be understood that the order of the operations in FIG. 4A is merely by way of example and may be performed in different orders than those that are illustrated and some operations may be excluded, and different combinations of the operations may be performed. The method 400 may include one or more operations for creating or retrieving (determining) a profile for a particular user, as illustrated by block 402. The method 400 proceeds to the next block 404, at which stage, the method may include one or more operations for managing the particular user's profile or determining a context corresponding the particular user's profile. The method 400 then proceeds to the next block 406, at which stage, the method may include one or more operations for either creating or retrieving one or more achievements within an online community (e.g., social network). The method 400 then proceeds to the next block 408, at which stage, the method may include one or more operations for determining (for example, a context corresponding to) a user activity (e.g., number of friends, message content, planned events, etc.) from the particular user's profile (after obtaining permission). The method 400 then proceeds to the next block 410, at which stage, the method 400 may include one or more operations including awarding an achievement to the particular user based on the activity (for example, a context corresponding to a user interaction) of the particular user. The method 400 then proceeds to the next block 412, at which stage, the method 400 notifies (e.g., via email, instant messaging, posts, etc.) the particular user of the awarded achievement designation.

Figure 4B:
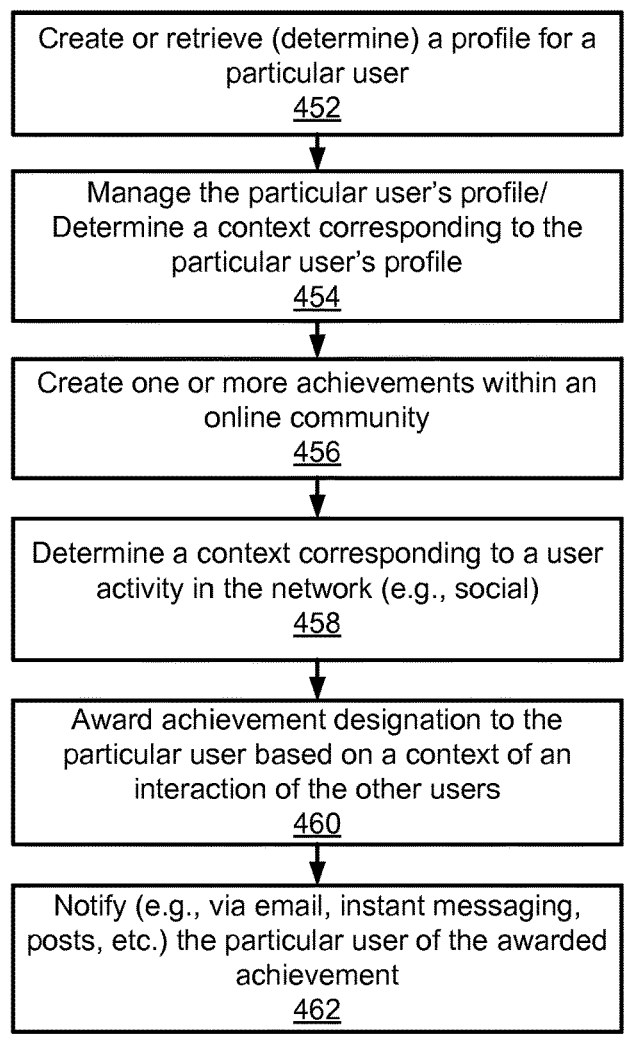
FIG. 4B is a flowchart of an example method for awarding an achievement designation to a particular user based on other users' activities/information.

FIG. 4B is a flow chart illustrating an example of a method 450 for awarding an achievement designation to a particular user based on other users' activities/information. It should be understood that the order of the operations in FIG. 4B is merely by way of example and may be performed in different orders than those that are illustrated and some operations may be excluded, and different combinations of the operations may be performed. The method 450 can include operations for creating or retrieving (for example, determining) a profile for a particular user, as illustrated by block 452. The method 450 proceeds to the next block 454, at which stage, the method 450 manages the particular user's profile or determines a context corresponding to the particular user's profile. The method 450 then proceeds to the next block 456, at which stage, the method 450 creates one or more achievements within an online community or network. The method 450 then proceeds to the next block 458, at which stage, the method 450 determines a context corresponding to activity (e.g., number of friends, message content, planned events, etc.) from other users' profiles (after obtaining permission). The method 450 then proceeds to the next block 460, at which stage, the method 450 awards an achievement to the particular user based on the activity of the other users. The method 450 then proceeds to the next block 462, at which stage, the method 450 notifies (e.g., via email, instant messaging, posts, etc.) the particular user of the awarded achievement designation.

Figure 5:
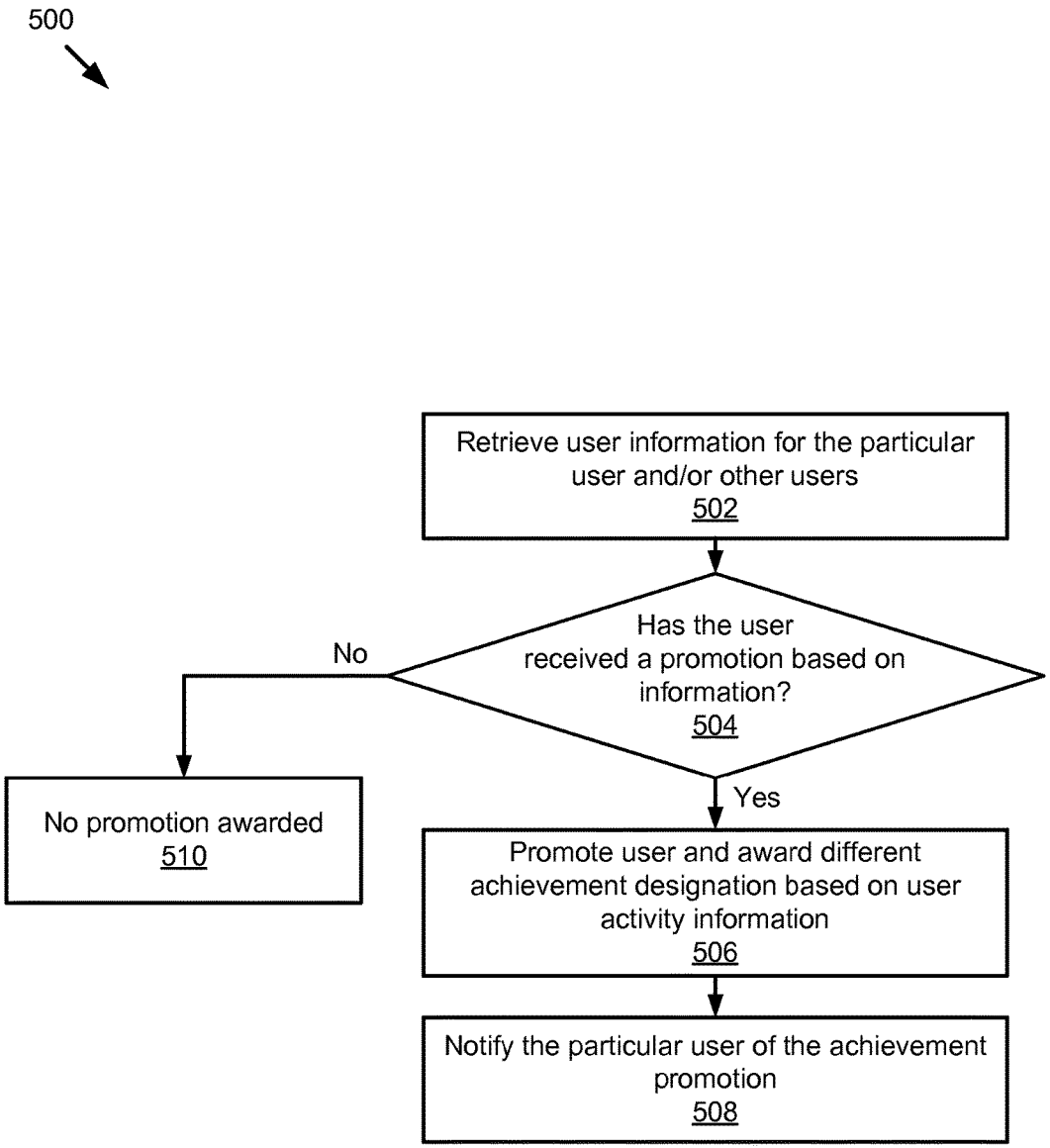
FIG. 5 is a flowchart of an example method for promoting a user's achievement designation.

FIG. 5 is a flow chart illustrating an example method 500 for promoting a user's achievement designation. It should be understood that the order of the operations in FIG. 5 is merely by way of example and may be performed in different orders than those that are illustrated and some operations may be excluded, and different combinations of the operations may be performed. The method 500 can include operations for retrieving user information for the particular user and/or other users, as illustrated by block 502. The method 500 proceeds to the next block 504, at which stage, the method 500 may include one or more operations for determining whether the user has received a promotion based on information. If the user has received a promotion based on information, the method 500 proceeds to the next block 506, at which stage, the method 500 may include one or more operations for promoting the user and awarding a different achievement designation based on user activity information. The method 500 then proceeds to the next block 508, at which stage, the method 500 notifies the particular user of the achievement promotion. If the user has not received a promotion based on information, the method 500 proceeds to the block 510, at which stage, the method 500 does not award an achievement to the particular user.

FIG. 6 is a graphic representation 600 of a list of example achievement categories and achievement designations. The graphic representation 600 includes a table 610 illustrating various examples of achievement designation categories and corresponding example achievement designations.

Figure 7:
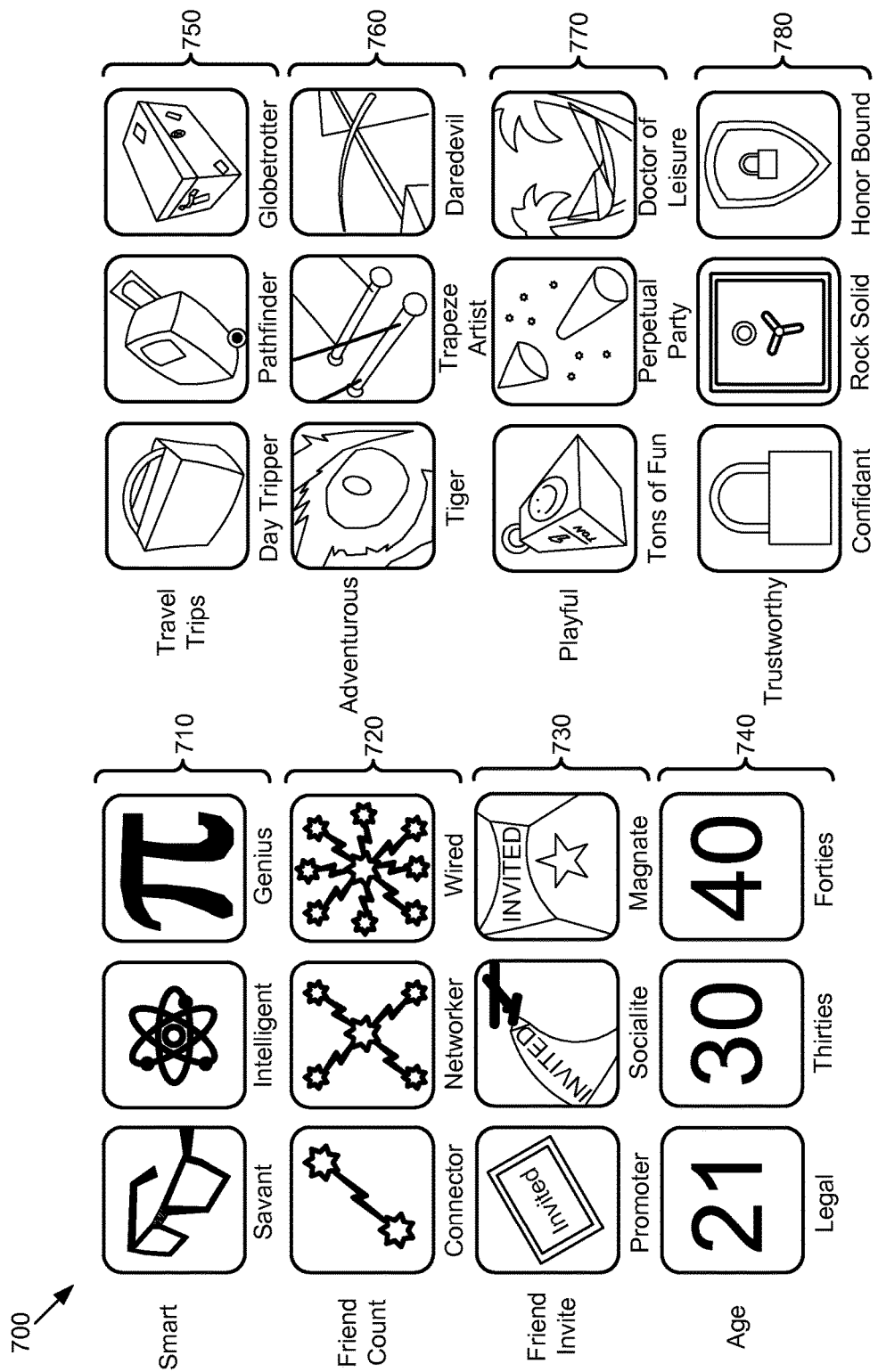
FIG. 7 is a graphic representation of example achievement designations.

FIG. 7 is a graphic representation 700 of example achievement designations. The graphic representation 700 includes two examples of achievement designations and their corresponding promotions. In some implementations, the achievement designation "Smart" indicated by reference numeral 710, includes three separate levels (i.e., promotions) "Savant," "Intelligent," and "Genius" including corresponding images (visual displays or icons) relating to the achievement designation. As one example, a user may receive a "Savant" achievement designation after the user indicates that he or she has read 5 technology articles. As another example, a user may earn an "Intelligent" achievement designation, after the user indicates that he or she has read 10 technology articles, and a "Genius" achievement designation after the user indicates that he or she has read 100 technology articles.

In some implementations, the achievement designation "Friend Count" indicated by reference numeral 720 includes three separate levels (i.e., promotions) "Connector," "Networker," and "Wired," including corresponding images (visual displays or icons) relating to the achievement designation. For example, a user may receive a "Connector" achievement designation after the user has connected with 10 friends, a "Networker" achievement designation after the user has connected with 25 friends, and a "Wired" achievement designation after the user has connected with 100 friends.

Figure 8:
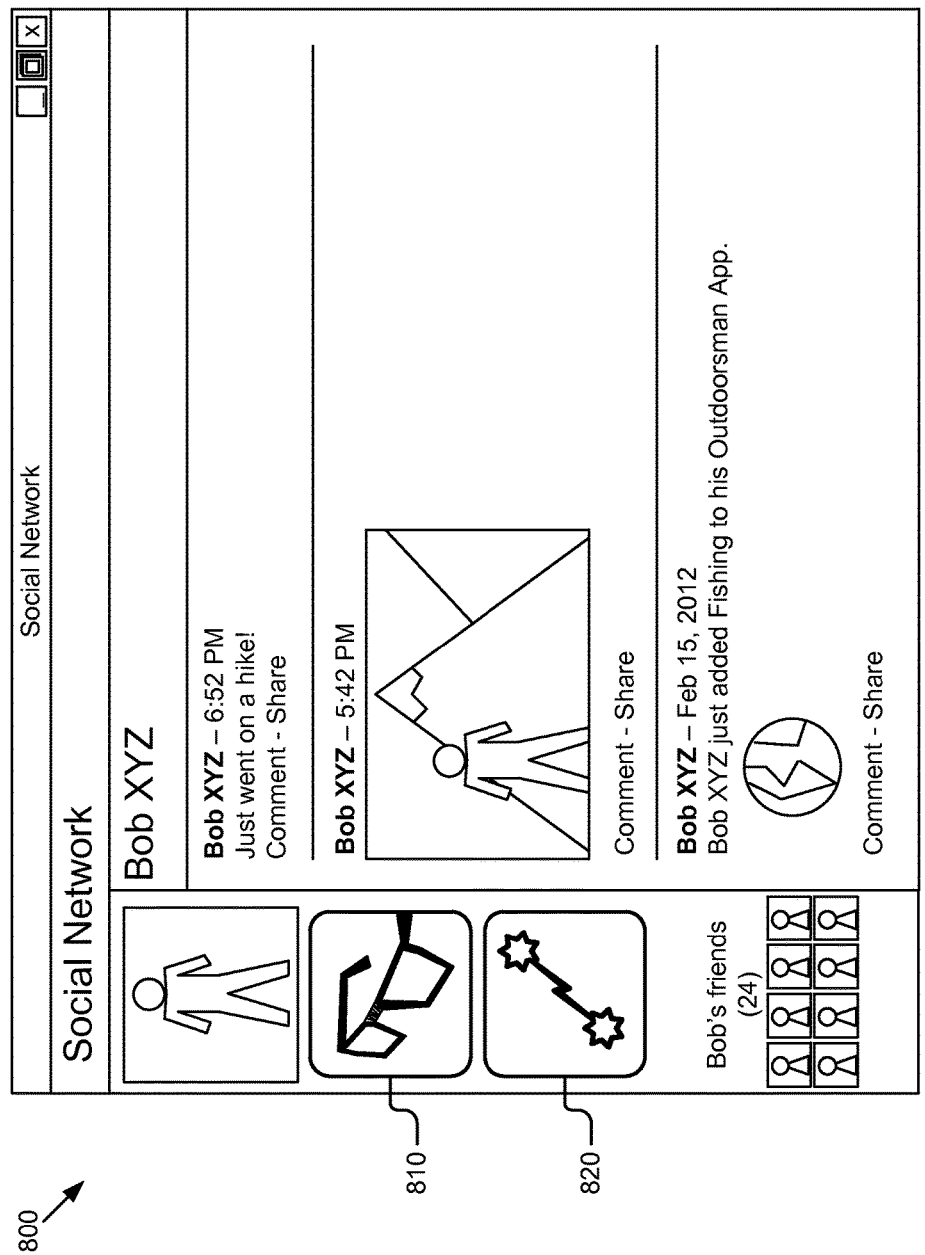
FIG. 8 is a graphic representation of an example user interface for displaying graphical representations of achievement designations.

FIG. 8 is a graphic representation of an example user interface 800 for display of graphical representations of achievement designations. The user interface 800 illustrates two example achievement designation images indicating that the user (Bob XYZ in this example) has earned the achievement designation 810 to show that he is a "Savant" in the "Smart" category and the achievement designation 820 to show that he is a "Connector" in the "Friend Count" category.

Figure 9:
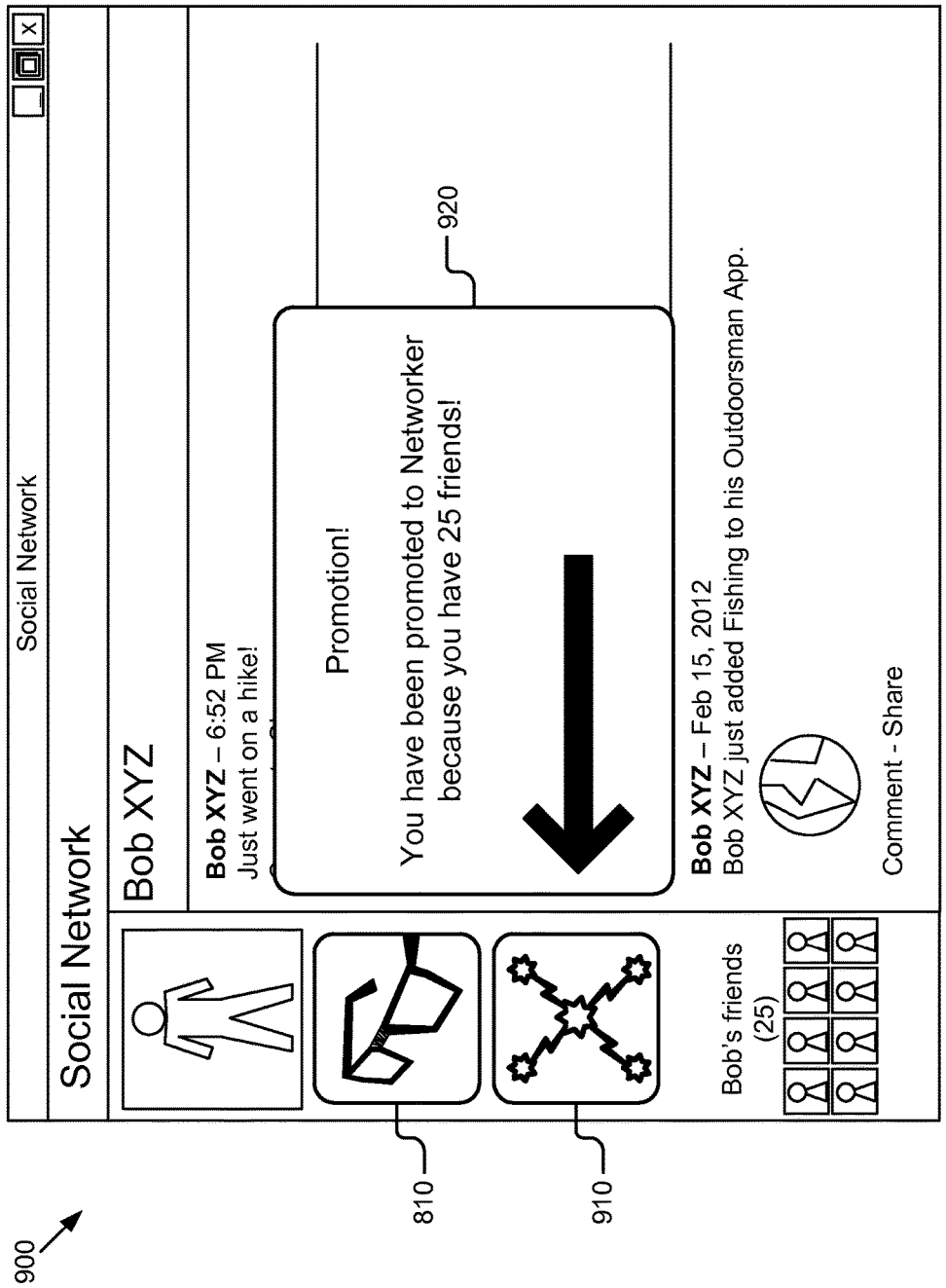
FIG. 9 is a graphic representation of an example user interface for promoting an achievement.

FIG. 9 is a graphic representation of an example user interface 900 for promoting an achievement. The user interface 900 illustrates two example achievement designation images indicating that the user (Bob XYZ in this example) has earned the achievement designation 810 to illustrate that he is a "Savant" in the "Smart" category. The user interface 900 also illustrates that Bob XYZ has earned a new achievement designation 910 to illustrate that he has risen to a "Networker" level in the "Friend Count" category and a corresponding notification 920 with an explanation that the previous achievement designation 820 (FIG. 8, indicating that he was a "Connector" in the "Friend Count" category) has been updated. The user interface 900 illustrates an achievement designation 910 to show that he has now earned a "Networker" status in the "Friend Count" category. The corresponding explanation 920 provides the explanation that the user (Bob XYZ in this example) now has 25 friends, 15 more than the 10 he had before.

Figure 10:
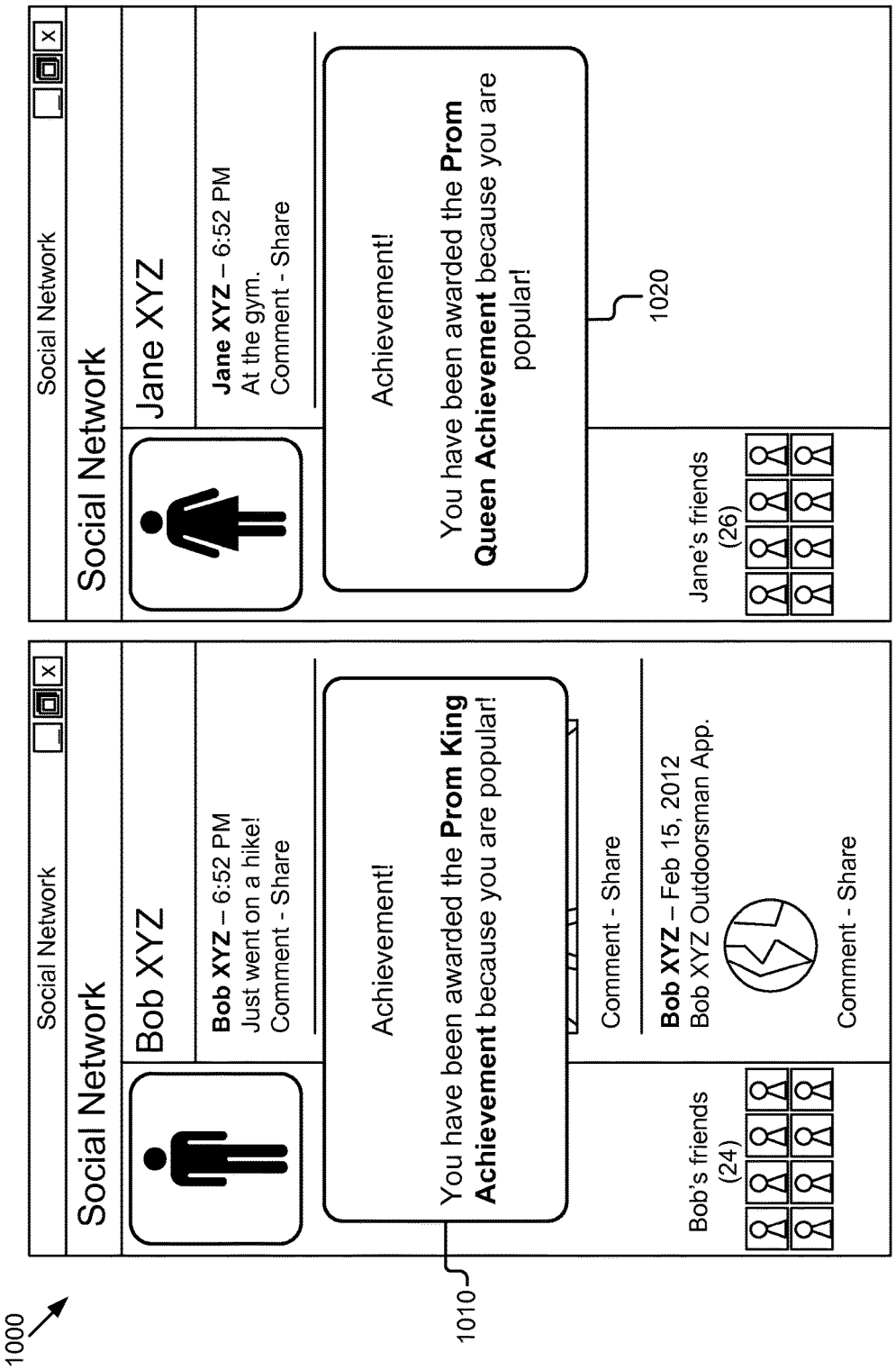
FIG. 10 is a graphic representation of an example user interface for awarding a gender based achievement.

FIG. 10 is a graphic representation of an example user interface 1000 for awarding a gender-based achievement. The user interface 1000 illustrates two example user interfaces side by side. A first example user interface illustrates a notification 1010 for notifying a male user, in this instance "Bob XYZ" that he has earned a "Prom King" status, therefore, has been accorded a "Prom King" achievement designation based on his popularity and gender. A second example user interface illustrates a notification 1020 for notifying a female user, in this instance, Jane XYZ that she has earned a "Prom Queen" status, and has been accorded a "Prom Queen" achievement designation based on her popularity and gender. The notifications 1010 and 1020 may be configured to appear on a social network wall for each user (in this instance, "Bob XYZ" and "Jane XYZ" to announce the achievement that the user has earned. The notification may be provided for display as a visual bubble, icon etc.

Figure 11:
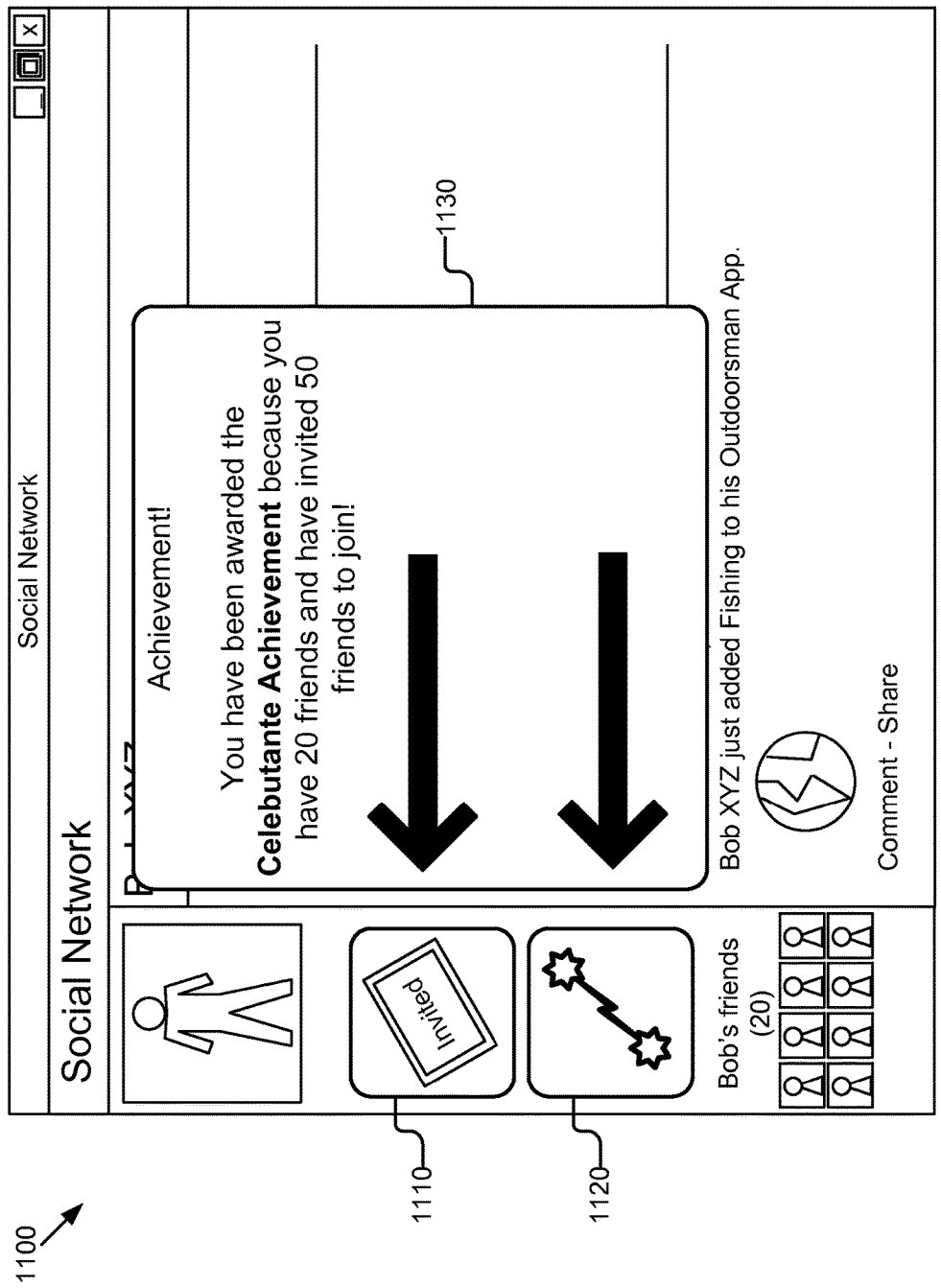
FIG. 11 is a graphic representation of an example user interface for awarding an achievement based on multiple achievements.

FIG. 11 is a graphic representation of an example user interface 1100 for awarding an achievement to a user based on the user earning multiple achievements. The user interface 1100 illustrates two example achievement designation images indicating that the user ("Bob XYZ" in this instance) has earned the achievement designation of "Promoter" in the "Friend Invite" category, as indicated by reference numeral 1110 and the achievement designation 1120 "Connector" in the "Friend Count" category, as indicated by reference numeral 1110. The user interface 1100 also illustrates a notification 1130 indicating that the user ("Bob XYZ" in this instance) has earned the "Celebutante" achievement designation because he has 20 friends and has invited 50 additional friends to join the social network. This notification 1130 may be configured to appear on the user's wall as illustrated or otherwise, as a visual button or icon or in any other way.

Figure 12A:
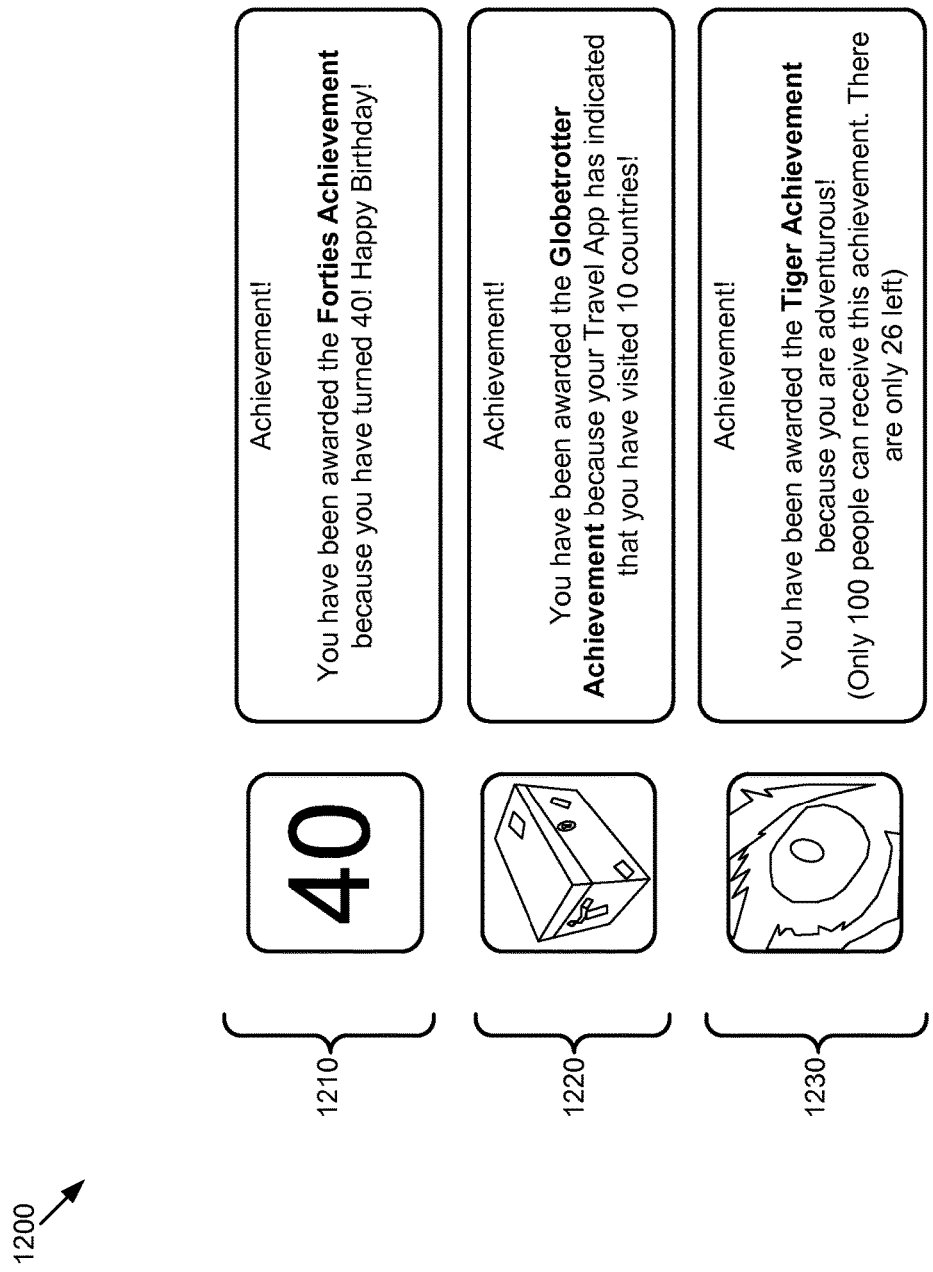
FIGS. 12A and 12B are graphic representations of example user interface displays of achievement designations based on predefined criteria.

FIG. 12A are graphic representations of example user interface displays of achievement designations based on predefined criteria, indicated by reference numeral 1200. The graphic representation 1200 illustrates example achievement designations and their corresponding predefined criteria. The first example that is illustrated is an achievement that may be awarded to a user based on the user's age. In this particular example, the achievement designation 1210 may accord a "Forties" status to the user who has just turned "40." This achievement designation may appear as an image as illustrated or may appear as a written announcement.

The second example that is illustrated is an achievement that may be accorded to a user, based on the amount of travel undertaken by the user. A user's extensive travels may be received via a traveling application and the system may accord a "Globetrotter" status to the user. The user earns the "Globetrotter" achievement status, and the system automatically provides a "Globetrotter" achievement designation 1220 for display to the user.

The third example that is illustrated is an achievement that may be accorded to a user based on a personality type. In this instance, a user is accorded a "Tiger" status, indicated by an achievement designation "Tiger" 1230 that may be provided for display. The achievement designation may be displayed as an image that may be awarded based on the personality type of the user, which may be determined by an application or otherwise.

Figure 12B:
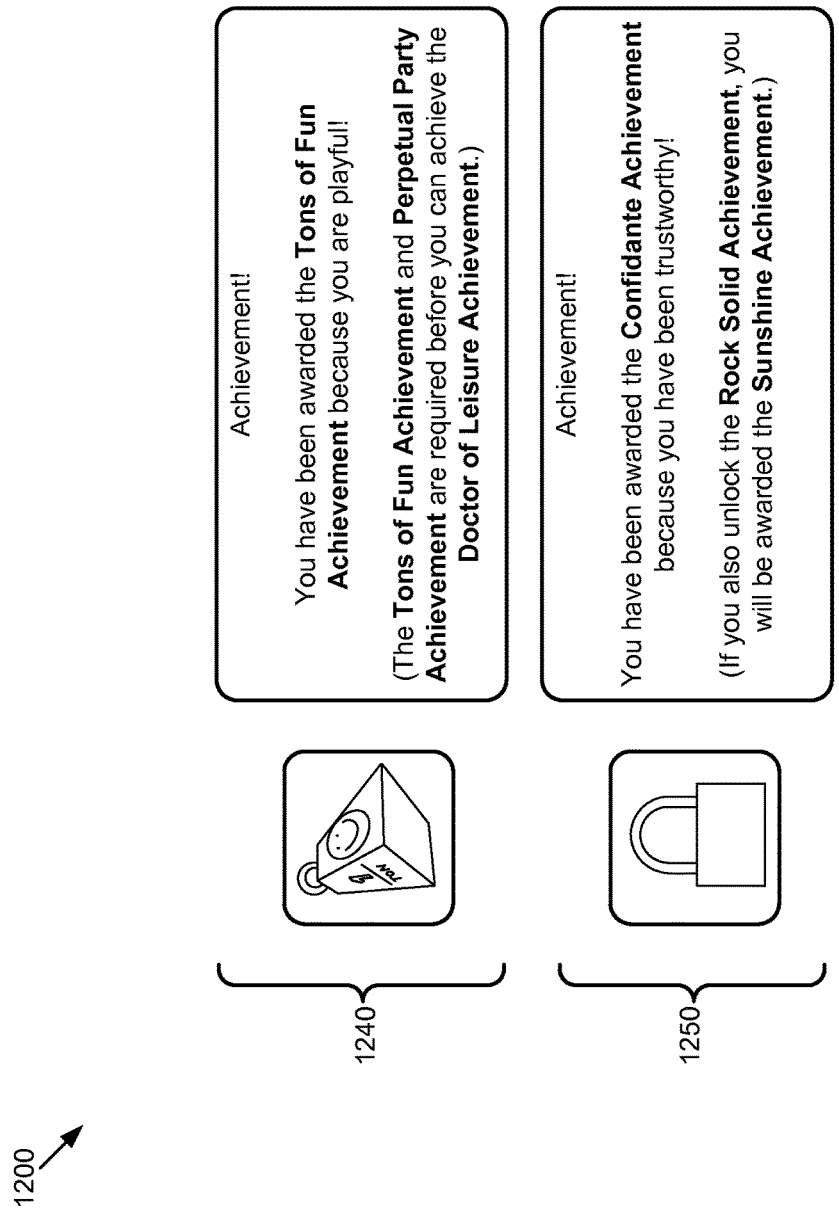

FIG. 12B are graphic representations of additional example user interface displays, indicated generally by reference numeral 1200. The system may automatically award a particular user with a "Tons of Fun" achievement designation, again, based on determining the personality type of the user from user activities, as indicated by reference numeral 1240. In this instance, the user activities may reflect that the user is playful. This achievement designation may be provided for display to the particular user, either with an image or a written announcement that is configured to appear as a visual display (a button or icon etc.). In some instances, the system may provide indications to the user of other achievement levels that the user may earn and the requirements that the user must satisfy before earning the other achievement levels that may have more stringent requirements. For instance, a user may obtain a "Perpetual Party" achievement, in addition to the "Tons of Fun" achievement, for the user to be eligible for a "Doctor of Leisure" achievement. As another example, a user may be awarded an achievement status of "Confidante," indicated by achievement designation 1250 that is provided for display via a corresponding image. This achievement status may reflect that the user's personality is trustworthy. In some instances, the system may inform the user, by providing a display (of an image or a written announcement) that the user can unlock another "Rock Solid" achievement to automatically earn a "Sunshine" achievement. This achievement configuration is indicated by reference numeral 1250.

Figure 13:
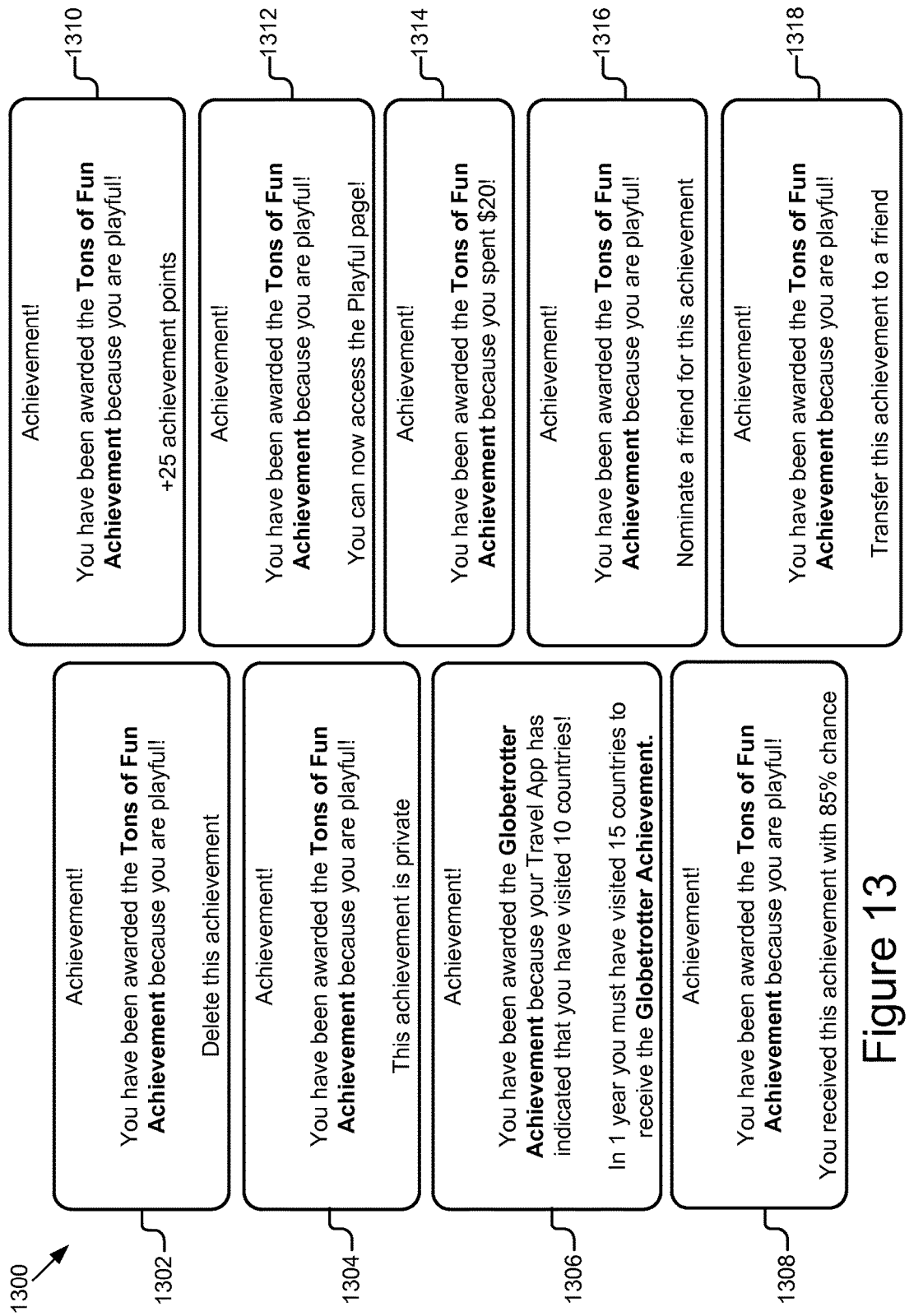
FIG. 13 is a graphic representation of example user interface displays of achievement designation notifications.

FIG. 13 is a graphic representation of several example user interface actions that the system may provide with respect to the achievement designation notifications. As one example, the achievement designation notification 1302 illustrates a "Tons of Fun" achievement designation with an indication of a capability to delete the "Tons of Fun" achievement designation. As an additional example, the achievement designation notification 1304 illustrates a "Tons of Fun" achievement designation with an indication of the capability to mark the "Tons of Fun" achievement designation as private. As yet another additional example, the achievement designation notification 1306 illustrates a "Globetrotter" achievement designation with an indication of the criteria that the user may satisfy to maintain the "Globetrotter" status. In this instance, the criteria defines the number of countries that the user may visit in a predetermined time period (for example, one year), As yet another additional example, the achievement designation notification 1308 illustrates a "Tons of Fun" achievement designation with an indication of the probability for according the "Tons of Fun" achievement designation. As another additional example, the achievement designation notification 1310 illustrates a "Tons of Fun" achievement designation with an indication of the level of points for the "Tons of Fun" achievement designation. As another additional example, the achievement designation notification 1312 illustrates a "Tons of Fun" achievement designation with an indication that the "Tons of Fun" achievement designation may unlock certain content (in this instance, the designation permits the user to unlock the "Playful" page) within a social network or otherwise. As yet another additional example, the achievement designation notification 1314 illustrates a "Tons of Fun" achievement designation with an indication that the "Tons of Fun" achievement designation may be awarded based on a total amount of purchase (for example, $20.00). The achievement designation notification 1316 illustrates a "Tons of Fun" achievement designation with an indication of an ability to nominate a friend for the "Tons of Fun" achievement designation. The achievement designation notification 1318 illustrates a "Tons of Fun" achievement designation with an indication of an ability to transfer the "Tons of Fun" achievement designation to a friend within the social network.

The foregoing description of the implementations of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method, comprising:
   determining, using at least one computing device, a first context corresponding to an online networking profile of a first user and an identified activity of the first user within an online network;
   automatically and algorithmically determining, using the at least one computing device, specifically for the first user, a first set of requirements including a first threshold for achieving a first level of a first achievement designation within the online network based on context-based criteria specific to the first user, the first level of achievement designation awarded via a third party application, the context-based criteria specific to the first user and including the identified activity and a property specific to the first user;
   automatically and algorithmically determining, using the at least one computing device, specifically for a second user, a second set of requirements including a second threshold for achieving the first level of the first achievement designation within the online network based on context-based criteria specific to the second user, wherein the first threshold for achieving the first level of the first achievement designation determined for the first user differs from the second threshold for achieving the first level of the first achievement designation determined for the second user;
   setting, using the at least one computing device, the first threshold for achieving the first level of the first achievement designation within the online network based on context-based criteria specific to the first user;
   setting, using the at least one computing device, the second threshold for achieving the first level of the first achievement designation within the online network based on context-based criteria specific to the second user;
   automatically generating, using the at least one computing device, a first instance of the first achievement designation within the online network, the first instance of the first achievement designation within the online network associated with the first user and having the first set of requirements including the first threshold determined automatically and algorithmically for the first level of the first achievement designation specifically for the first user;
   automatically generating, using the at least one computing device, a second instance of the first achievement designation within the online network associated with a second user having the second set of requirements including the second threshold automatically determined automatically and algorithmically for the first level of the first achievement designation specifically for the second user, wherein the second threshold differs from the first threshold for achieving the first level of the first achievement designation determined for the first user;
   determining, using the at least one computing device, based on the context-based criteria specific to the first user, whether the first user satisfies the first set of requirements including the first threshold determined for the first level of achievement designation for the first instance based on the profile of the first user including the property and the activity of the first user including the identified activity, wherein the first achievement designation is one of a plurality of achievement designations, the plurality of achievement designations including the first achievement designation and a second achievement designation, each of the achievement designations having an image, wherein the image for each of the achievement designations is different from images for other achievement designations;
   automatically assigning, by the at least one computing device, the first level of achievement designation for the first instance to the first user based on the context of the first user satisfying the requirements determined for the first user based on the context-based criteria specific to the first user;
   notifying, using the at least one computing device, the first user of the assignment of the first level of achievement designation;
   providing for display, using the at least one computing device, the first level of achievement designation along with the context corresponding to the profile of the first user and a first notification of the first level of achievement designation on a user interface associated with the first user, wherein the first notification includes an indication through which the first user can interact with the first level of achievement designation;
   determining whether there is a promotion from the first level of achievement designation; and
   responsive to determining that there is the promotion, updating the user interface associated with the first user to display a second notification of a second level of achievement designation, and to display an image different from that of the first level of achievement designation to reflect the promotion.

2. The method according to claim 1, wherein the plurality of achievement designations represents a social characteristic that users share in the online network.

3. The method according to claim 1, wherein the assignment of the first level of achievement designation for a first achievement category unlocks an achievement designation for a third achievement category, the achievement designation for the third achievement category associated with requirements including the promotion from the first level of achievement designation for the first achievement category and an achievement designation for a second achievement category.

4. The method according to claim 1, wherein the assignment of the first level of achievement designation unlocks particular content within the online network.

5. The method according to claim 1, wherein the assignment of the first level of achievement designation is awarded based on a purchase.

6. The method according to claim 1, wherein the first level of achievement designation is assigned based on a nomination process.

7. The method according to claim 1, wherein the assignment of the first level of achievement designation awards a benefit, to the first user, of participation in a particular activity.

8. The method according to claim 1, wherein the assignment of the first level of achievement designation awards a benefit, to the first user, of display of the first level of achievement designation via a public profile.

9. A computer program product, the computer program product comprising a non-transitory computer usable medium including a computer readable program, wherein the computer readable program when executed on a computer causes the computer to:

determine a first context corresponding to an online networking profile of a first user and an identified activity of the first user within an online network;

automatically and algorithmically determine, using the at least one computing device, specifically for the first user, a first set of requirements including a first threshold achieving for a first level of a first achievement designation within the online network based on context-based criteria specific to the first user, the first level of achievement designation awarded via a third party application, the context-based criteria specific to the first user including the identified activity and a property specific to the first user;

automatically and algorithmically determine, using the at least one computing device, specifically for a second user, a second set of requirements including a second threshold for achieving the first level of the first achievement designation within the online network based on context-based criteria specific to the second user, wherein the first threshold for achieving the first level of the first achievement designation determined for the first user differs from the second threshold for achieving the first level of the first achievement designation determined for the second user;

set the first threshold for achieving the first level of the first achievement designation within the online network based on context-based criteria specific to the first user;

set the second threshold for achieving the first level of the first achievement designation within the online network based on context-based criteria specific to the second user;

automatically generate a first instance of the first achievement within the online network, the first instance of the first achievement designation within the online network associated with the first user and having requirements determined automatically and algorithmically for the first level of the first achievement designation specifically for the first user;

automatically generate a second instance of the first achievement designation within the online network associated with a second user having the second set of requirements including the second threshold automatically determined automatically and algorithmically for the first level of the first achievement designation specifically for the second user, wherein the second threshold differs from the first threshold for achieving the first level of the first achievement designation determined for the first user;

determine, based on the context-based criteria specific to the first user, whether the first user satisfies the first set of requirements including the first threshold determined for the first level of achievement designation for the first instance based on the profile of the first user including the property and the activity of the first user including the identified activity, wherein the first achievement designation is one of a plurality of achievement designations, the plurality of achievement designations including the first achievement designation and a second achievement designation, each of the achievement designations having an image, wherein the image for each of the achievement designations is different from images for other achievement designations;

automatically assign the first level of achievement designation for the first instance to the first user based on the context of the first user satisfying the requirements determined for the first user based on the context-based criteria specific to the first user;

notify the first user of the assignment of the first level of achievement designation;

provide for display the first level of achievement designation along with the context corresponding to the profile of the first user and a first notification of the first level of achievement designation on a user interface associated with the first user, wherein the first notification includes an indication through which the first user can interact with the first level of achievement designation;

determine whether there is a promotion from the first level of achievement designation; and responsive to determining that there is the promotion, update the user interface associated with the first user to display a second notification of a second level of achievement designation, and to display an image different from that of the first level of achievement designation to reflect the promotion.

10. The computer program product according to claim 9, wherein the plurality of achievement designations represents a social characteristic that users share in the online network.

11. The computer program product according to claim 9, wherein the assignment of the first level of achievement designation for a first achievement category unlocks an achievement designation for a third achievement category, the achievement designation for the third achievement category associated with requirements including the promotion from the first level of achievement designation for the first achievement category and an achievement designation for a second achievement category.

12. The computer program product according to claim 9, wherein the assignment of the first level of achievement designation unlocks particular content within the online network.

13. The computer program product according to claim 9, wherein the assignment of the first level of achievement designation is awarded based on a purchase.

14. The computer program product according to claim 9, wherein the first level of achievement designation is assigned based on a nomination process.

15. The computer program product according to claim 9, wherein the assignment of the first level of achievement designation awards a benefit, to the first user, of participation in a particular activity.

16. The computer program product according to claim 9, wherein the assignment of the first level of achievement designation awards a benefit, to the first user, of display of the first level of achievement designation via a public profile.

17. A system comprising:
a processor; and
a memory, storing instructions that, when executed, cause the system to,
determine a first context corresponding to an online networking profile of a first user and an identified activity of the first user within an online network;
automatically and algorithmically determine, using the at least one computing device, specifically for the first user, a first set of requirements including a first threshold for achieving a first level of a first achievement designation within the online network based on context-based criteria specific to the first user, the first level of achievement designation awarded via a third party application, the context-based criteria specific to the first user including the identified activity and a property specific to the first user;
automatically and algorithmically determine, using the at least one computing device, specifically for a second user, a second set of requirements including a second threshold for achieving the first level of the first achievement designation within the online network based on context-based criteria specific to the second user, wherein the first threshold for achieving the first level of the first achievement designation determined for the first user differs from the second threshold for achieving the first level of the first achievement designation determined for the second user;
setting, using the at least one computing device, the first threshold for achieving the first level of the first achievement designation within the online network based on context-based criteria specific to the first user;
setting, using the at least one computing device, the second threshold for achieving the first level of the first achievement designation within the online network based on context-based criteria specific to the second user;
automatically generate a first instance of the first achievement within the online network, the first instance of the first achievement designation within the online network associated with the first user and having requirements determined automatically and algorithmically for the first level of the first achievement designation specifically for the first user;
automatically generate a second instance of the first achievement designation within the online network associated with a second user having the second set of requirements including the second threshold automatically determined automatically and algorithmically for the first level of the first achievement designation specifically for the second user, wherein the second threshold differs from the first threshold for achieving the first level of the first achievement designation determined for the first user;
determine, based on the context-based criteria specific to the first user, whether the first user satisfies the first set of requirements including the first threshold determined for the first level of achievement designation for the first instance based on the profile of the first user including the property and the activity of the first user including the identified activity, wherein the first achievement designation is one of a plurality of achievement designations, the plurality of achievement designations including the first achievement designation and a second achievement designation, each of the achievement designations having an image, wherein the image for each of the achievement designations is different from images for other achievement designations;
automatically assign the first level of achievement designation for the first instance to the first user based on the context of the first user satisfying the requirements determined for the first user based on the context-based criteria specific to the first user;
notify the first user of the assignment of the first level of achievement designation;
provide for display the first level of achievement designation along with the context corresponding to the profile of the first user and a first notification of the first level of achievement designation on a user interface associated with the first user, wherein the first notification includes an indication through which the first user can interact with the first level of achievement designation;
determine whether there is a promotion from the first level of achievement designation; and
responsive to determining that there is the promotion, update the user interface associated with the first user to display a second notification of a second level of achievement designation, and to display an image different from that of the first level of achievement designation to reflect the promotion.

18. The system according to claim 17, wherein the plurality of achievement designations represents a social characteristic that users share in the online network.

19. The system according to claim 17, wherein the assignment of the first level of achievement designation for a first achievement category unlocks an achievement designation for a third achievement category, the achievement designation for the third achievement category associated with requirements including the promotion from the first level of achievement designation for the first achievement category and an achievement designation for a second achievement category.

20. The system according to claim 17, wherein the assignment of the first level of achievement designation unlocks particular content within the online network.

21. The system according to claim 17, wherein the assignment of the first level of achievement designation is awarded based on a purchase.

22. The system according to claim 17, wherein the first level of achievement designation is assigned based on a nomination process.

23. The system according to claim 17, wherein the assignment of the first level of achievement designation awards a benefit, to the first user, of participation in a particular activity.

24. The system according to claim 17, wherein the assignment of the first level of achievement designation awards a benefit, to the first user, of display of the first level of achievement designation via a public profile.

* * * * *